United States Patent
Sung et al.

(10) Patent No.: US 8,556,509 B2
(45) Date of Patent: Oct. 15, 2013

(54) ACTIVE COMPENSATING HYDROSTATIC BEARING AND HYDROSTATIC BEARING MODULE USING THE SAME

(75) Inventors: Cheng-Kuo Sung, Hsinchu (TW);
Zhang-Hua Fong, Chiayi County (TW);
Jia-Wei Lu, Taoyuan County (TW);
Yu-Min Hung, Taichung (TW);
Wei-Chih Lee, Chiayi (TW)

(73) Assignee: National Tsing Hua University, Hsinchu (TW)

( * ) Notice: Subject to any disclaimer, the term of this patent is extended or adjusted under 35 U.S.C. 154(b) by 33 days.

(21) Appl. No.: 13/357,148

(22) Filed: Jan. 24, 2012

(65) Prior Publication Data
US 2013/0016927 A1 Jan. 17, 2013

(30) Foreign Application Priority Data
Jul. 12, 2011 (TW) .............................. 100124626 A (51) Int. Cl.
*F16C 32/06* (2006.01)
(52) U.S. Cl.
USPC .......................................................... 384/12
(58) Field of Classification Search
USPC ....................................................... 384/8, 12
See application file for complete search history.

(56) References Cited

U.S. PATENT DOCUMENTS

| | | | | |
|---|---|---|---|---|
| 3,137,530 A | * | 6/1964 | Kohler | 384/12 |
| 4,368,930 A | * | 1/1983 | Duchaine | 384/12 |
| 6,428,210 B1 | * | 8/2002 | Kafai | 384/12 |

* cited by examiner

*Primary Examiner* — James Pilkington
*Assistant Examiner* — Richard V Wu
(74) *Attorney, Agent, or Firm* — Muncy, Geissler, Olds & Lowe, PLLC (57) ABSTRACT

An active/self-sensing compensating hydrostatic bearing is disposed between first and second structures to allow relative movement between the first and second structures. The hydrostatic bearing includes a body and a compensator. The body, fixed to the first structure and separated from the second structure by a first gap, has a chamber and an input passage and an output passage both communicating with the chamber. The compensator is disposed in the chamber. A compensating passage, communicating with the input passage and the output passage, is formed between the body and the compensator. A pressurized fluid flows from the input passage to the output passage through the compensating passage, and the pressurized fluid in the output passage flows to the first gap to maintain the stability and the rigidity for the relative movement between the first and second structures. A hydrostatic bearing module using the hydrostatic bearing is also disclosed.

17 Claims, 8 Drawing Sheets

ACTIVE COMPENSATING HYDROSTATIC BEARING AND HYDROSTATIC BEARING MODULE USING THE SAME

This application claims priority of No. 100124626 filed in Taiwan R.O.C. on Jul. 12, 2011 under 35 USC 119, the entire content of which is hereby incorporated by reference.

BACKGROUND OF THE INVENTION

1. Field of the Invention

The invention relates in general to an active/self-sensing compensating hydrostatic bearing and a hydrostatic bearing module using the same, and more particularly to a hydrostatic bearing using a compensator for performing an active compensation and a hydrostatic bearing module using the same.

2. Related Art

Bearings are indispensable key components in precise mechanical machine tools. A non-contact-type hydrostatic bearing can provide the high rigidity and high precision properties for the submicron machining technology, and is thus frequently used in a large-scale machine tool. The hydrostatic bearing always works under the liquid lubrication from the start to the stop. That is, the normal oil film fluid may also be established in the zero-speed state, and the bearing does not directly contact the spindle, so that the bearing has the long lifetime and requires the low starting power. In addition, the hydrostatic bearing also has the advantages of the high rotation precision and the high stiffness of the oil film, and is thus widely applied to the heavy, precise and high-efficiency machine and apparatus.

The hydrostatic bearing keeps the stable oil film pressure using an external oil supply system to provide a pressurized fluid and using the multi-pocket structure design in the bearing. The pressure difference between the pockets is the source for the bearing to provide the load-carrying capacity. For the constant-pressure oil supply system with the single pressure supply, the bearing must have a pressure compensator for compensating the pressure in the pocket, and this compensator is referred to as a restrictor. Different types of restrictors provide different bearing performances. More particularly, the rigidity of the bearing is mainly based on the restrictor, so the restrictor is the main component in the hydrostatic bearing. The restrictors used in the industry can be classified into a fixed restrictor and an active restrictor. The fixed restrictor may be a capillary-type restrictor, a slit restrictor, an orifice restrictor or the like. The geometric shape of the fixed restrictor cannot change according to the change of the operation condition. The internal geometric structure of the active restrictor, such as a slide valve restrictor or a film feedback restrictor, is automatically adjusted due to the change of the external load or the pocket pressure. If the design and adjustment are made properly, the active restrictor can have the load-carrying capacity and the rigidity higher than those of the fixed restrictor. However, since the conventional hydrostatic bearing system always has the externally connected restrictor, which is connected to the pocket through an oil conduit, the delay is caused in the compensation response due to the oil conduit between the restrictor and the pocket. Therefore, the conventional hydrostatic bearing system has the problem of operation delay. In addition, the conventional capillary-type restrictor or aperture restrictor, for example, has the poor static rigidity because the restrictor flow resistance caused by the capillary-type restrictor is a constant and cannot be adjusted to perform the compensation according to the variation of the pocket pressure.

Thus, an active compensation restrictor bearing is provided to achieve the high static and dynamic rigidity and the stable behavior, so that the new possibility can be provided to the actual technical application.

SUMMARY OF THE INVENTION

It is therefore an object of the invention to provide an active compensating/self-sensing hydrostatic bearing, which has the high static rigidity and the good dynamic rigidity and is suitable for the high precision application and the dynamic load variation, and a hydrostatic bearing module using the same.

To achieve the above-identified object, the invention provides an active compensating hydrostatic bearing disposed between a first structure and a second structure to allow relative movement between the first structure and the second structure. The active compensating hydrostatic bearing includes a body and a compensator. The body is fixed to the first structure and separated from the second structure by a first gap, and has a chamber and an input passage and an output passage both communicating with the chamber. The compensator is disposed in the chamber. A compensating passage is formed between the body and the compensator, the compensating passage communicates with the input passage and the output passage, a pressurized fluid flows from the input passage to the output passage through the compensating passage, and the pressurized fluid in the output passage flows to the first gap to maintain stability and rigidity for the relative movement between the first and second structures.

The invention also provides a hydrostatic bearing module including a first structure, a second structure and a plurality of active compensating hydrostatic bearings disposed between the first structure and the second structure to allow relative movement between the first structure and the second structure.

The active compensating hydrostatic bearing and the hydrostatic bearing module using the same according to the invention have the following advantages. First, the static initial rigidity of the bearing is enhanced. That is, the relative movement between the first structure and the second structure has the high rigidity (small displacement) because the restrictor flow resistance of the invention is modulated according to the pocket pressure. Second, the pocket and the restrictor device are integrated in this invention, and the conventional delay problem, caused by the hydrostatic bearing system connected to the lubrication oil conduit and the operation of the restrictor, can be solved. Third, the bearing of the invention only has two main assemblies, so the structure thereof is simple, and the elements thereof can be conveniently maintained and replaced. Fourth, the bearing of the invention has the small response amplitude under the dynamic loads and thus has the good dynamic rigidity. The load response amplitude of the bearing corresponding to different external force excitation frequencies represents the dynamic rigidity. This compensator can function as a vibration absorber for effectively absorbing the vibration between the first structure and the second structure. The smaller vibration represents the better dynamic rigidity of the bearing and thus satisfies the large-scale and precise machine tool.

Further scope of the applicability of the present invention will become apparent from the detailed description given hereinafter. However, it should be understood that the detailed description and specific examples, while indicating preferred embodiments of the present invention, are given by way of illustration only, since various changes and modifications within the spirit and scope of the present invention will become apparent to those skilled in the art from this detailed description.

BRIEF DESCRIPTION OF THE DRAWINGS

The present invention will become more fully understood from the detailed description given hereinbelow and the accompanying drawings which are given by way of illustration only, and thus are not limitative of the present invention.

DETAILED DESCRIPTION OF THE INVENTION

The present invention will be apparent from the following detailed description, which proceeds with reference to the accompanying drawings, wherein the same references relate to the same elements.

Figure 1:
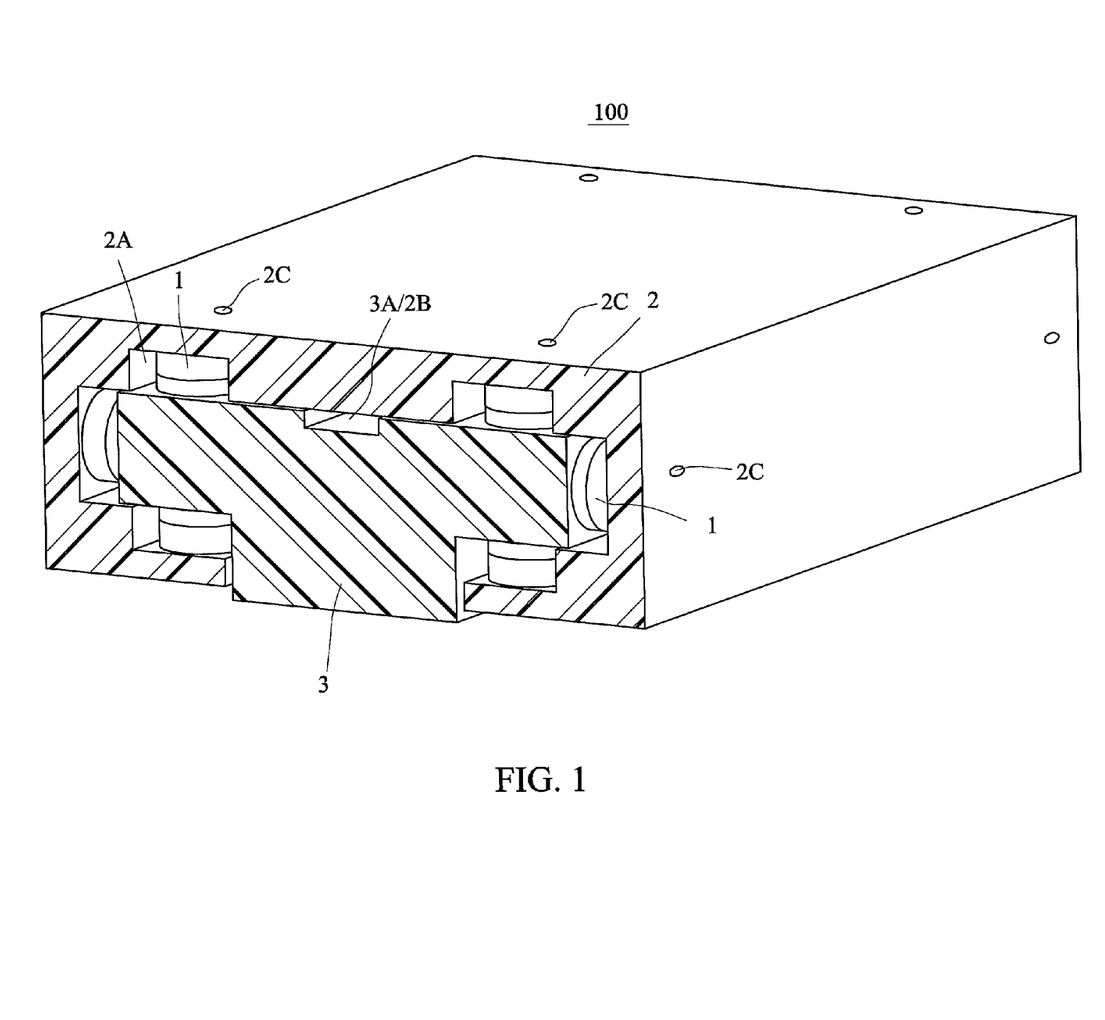
FIG. 1 is a cross-sectional view showing a hydrostatic bearing module according to a preferred embodiment of the invention.
Figure 2:
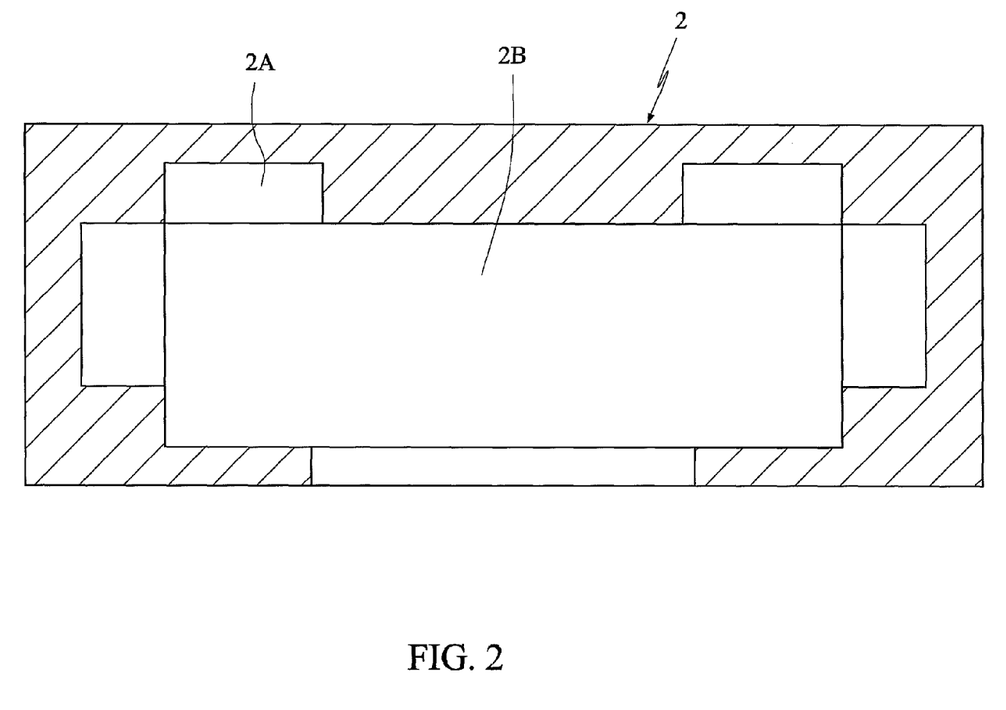
FIG. 2 is a cross-sectional view showing a first structure of the hydrostatic bearing module according to the preferred embodiment of the invention.

FIG. 1 is a cross-sectional view showing a hydrostatic bearing module 100 according to a preferred embodiment of the invention. FIG. 2 is a cross-sectional view showing a first structure of the hydrostatic bearing module 100 according to the preferred embodiment of the invention. Referring to FIGS. 1 and 2, the hydrostatic bearing module 100 of the invention includes a first structure 2, a second structure 3 and a plurality of active/self-sensing compensating hydrostatic bearings 1. The hydrostatic bearings 1 are disposed between the first structure 2 and the second structure 3 to allow relative movement between the first structure 2 and the second structure 3. In one example, the first structure 2 is, for example, a movable table of a machine tool, while the second structure 3 is, for example, a track of the machine tool, wherein the track is a T-shaped track and may also be a dovetailed track. However, the application of the invention is not austerely restricted thereto. In addition to the movable occasion, the invention may also be applied to the rotatable occasion to allow the relative rotation. Thus, the relative movement includes the relative translation and the relative rotation.

The first structure 2 has a plurality of first receiving slots 2A and a second receiving slot 2B. The first receiving slots 2A accommodate the active compensating hydrostatic bearings 1, respectively, and the second receiving slot 2B accommodates the second structure 3. Thus, the movable table can be moved along the track. The hydrostatic bearing 1 is fixed to the first structure 2 by way of, for example, adhering or using a screw (not shown) penetrating through a through hole (not shown) of the first structure 2 and screwing to the threaded hole 17 of the hydrostatic bearing 1. Thus, the hydrostatic bearing 1 is fixed to the first structure 2 and can be easily disassembled. In addition, in order to collect the liquid, such as the oil, the second structure 3 is formed with a collecting slot 3A, and the liquid collected in the collecting slot 3A may flow out in the frontward/backward direction.

Figure 3:
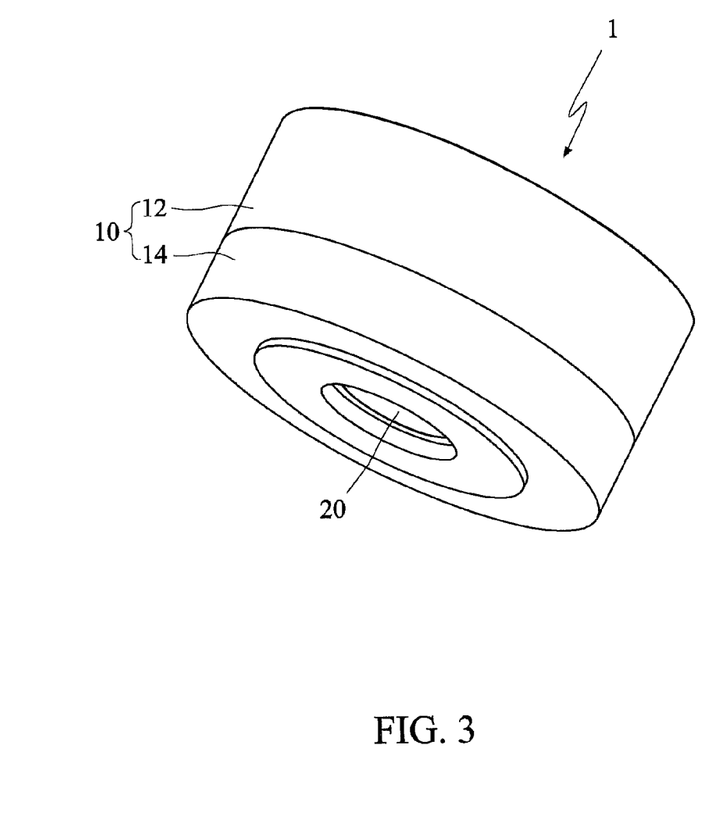
FIGS. 3 and 4 are pictorial views showing an active compensating hydrostatic bearing according to a first embodiment of the invention.
Figure 4:
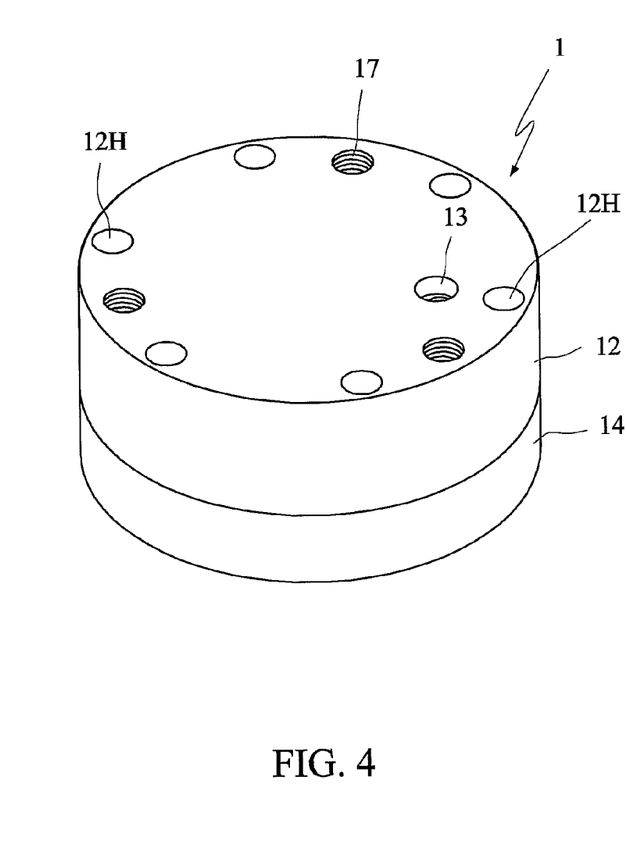
Figure 5:
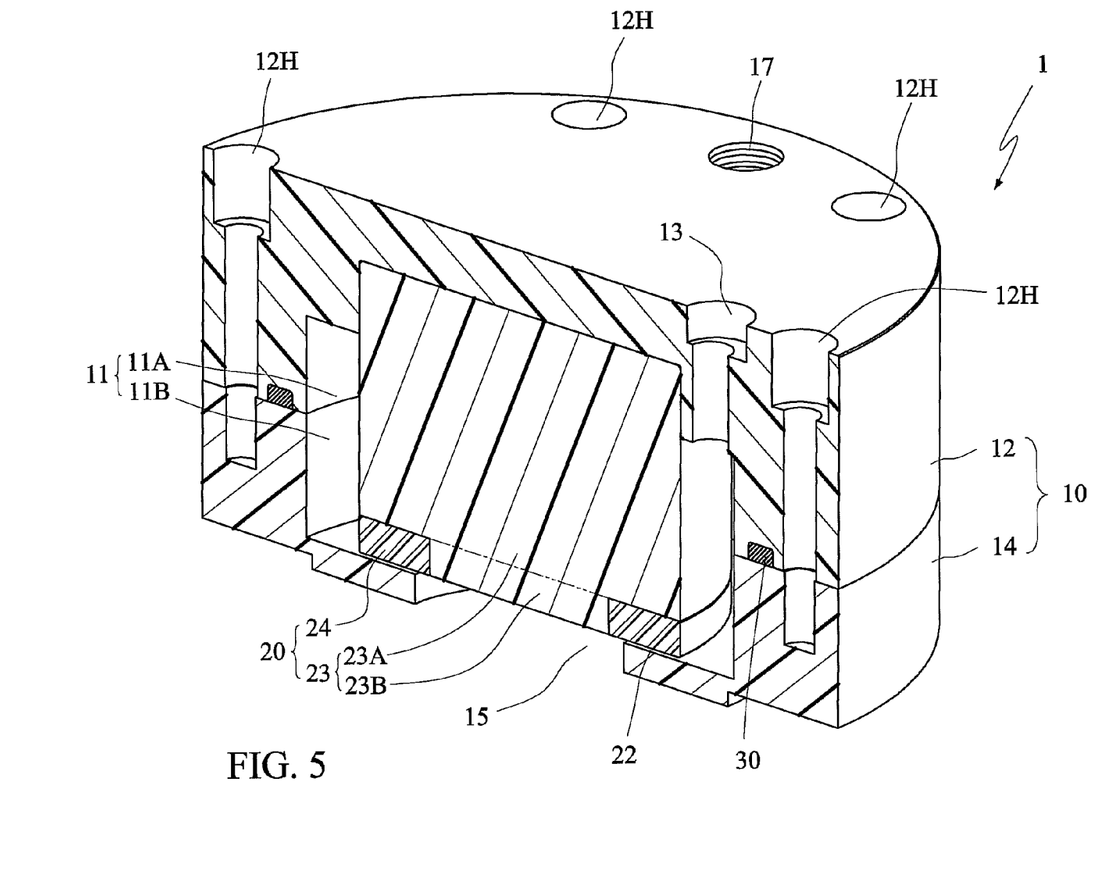
FIG. 5 is a cross-sectional view showing the active compensating hydrostatic bearing according to the first embodiment of the invention.
Figure 6:
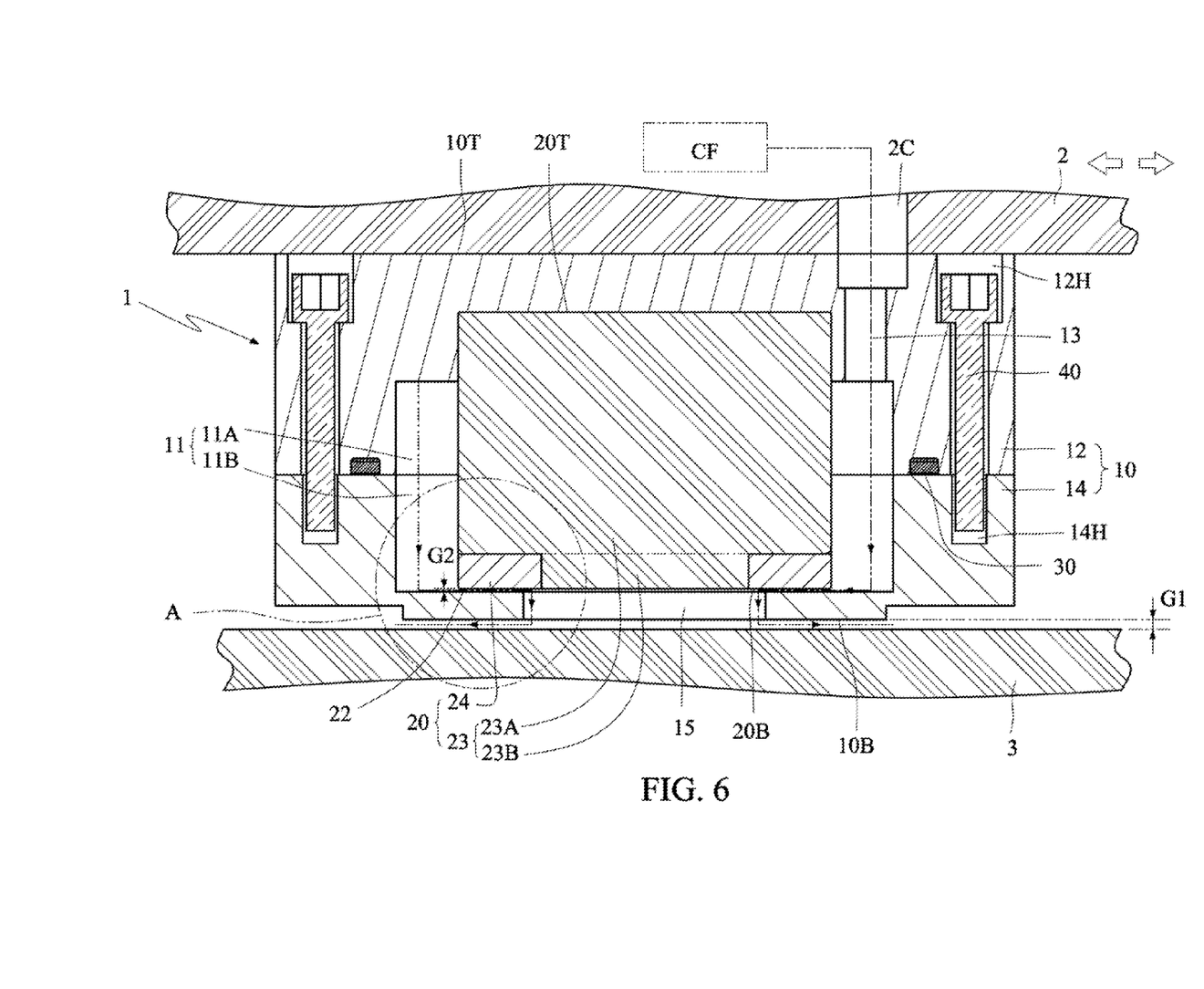
FIG. 6 is a cross-sectional view showing the active compensating hydrostatic bearing according to the first embodiment of the invention.
Figure 7:
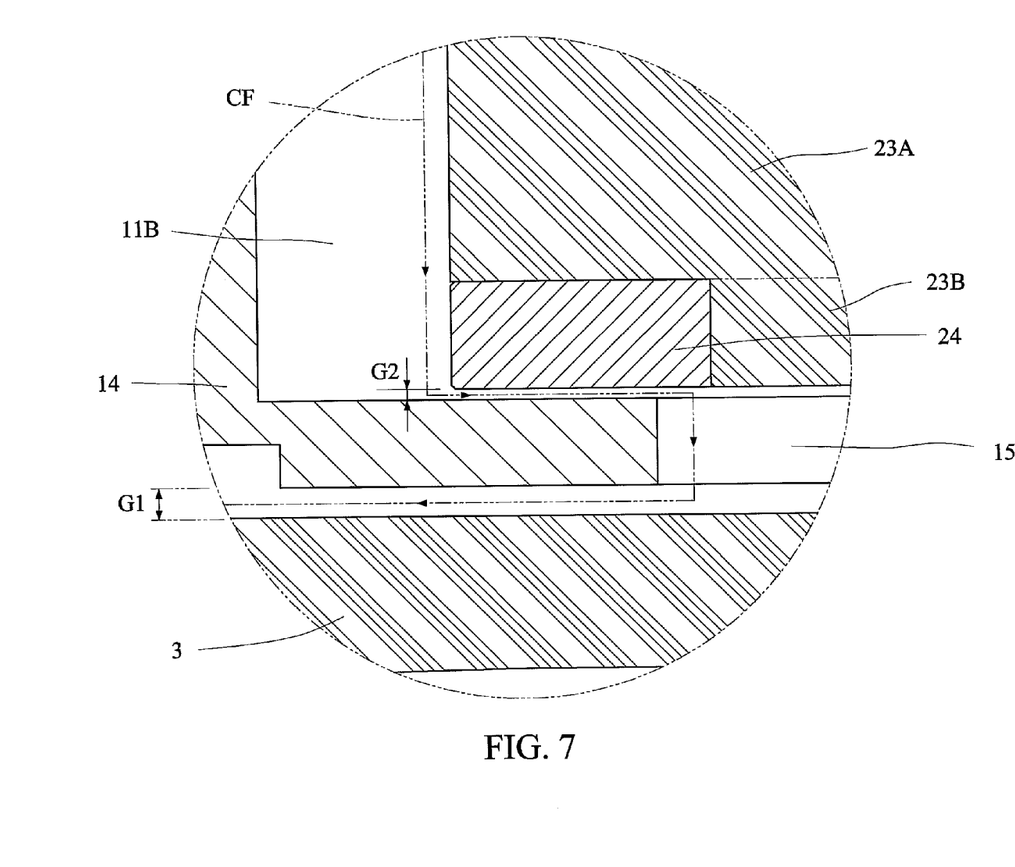
FIG. 7 is an enlarged view showing a circular area A of FIG. 6.

FIGS. 3 and 4 are pictorial views showing the active compensating hydrostatic bearing 1 according to a first embodiment of the invention. FIG. 5 is a cross-sectional view showing the active compensating hydrostatic bearing 1 according to the first embodiment of the invention. FIG. 6 is a cross-sectional view showing the active compensating hydrostatic bearing 1 according to the first embodiment of the invention. FIG. 7 is an enlarged view showing a circular area A of FIG. 6. Referring to FIGS. 3 to 7, the active compensating hydrostatic bearing 1 includes a body 10 and a compensator 20.

The body 10 has a first top surface 10T and a first bottom surface 10B disposed opposite the first top surface 10T. The body 10 is fixed to and in direct contact with the first structure 2, and the first bottom surface 10B is separated from the second structure 3 by a first gap G1. The body 10 further has a chamber 11 and an input passage 13 and an output passage 15 communicating with the chamber 11. In this embodiment, the body 10 includes a first body portion 12 and a second body portion 14. The first body portion 12 has a first chamber portion 11A of the chamber 11 and the input passage 13, and is fixed to the first structure 2. The second body portion 14 has a second chamber portion 11B of the chamber 11, and the first body portion 12 of the body 10 is fixed to the second body portion 14 of the body 10. For example, the first body portion 12 and the second body portion 14 are fixed together by screws 40. The screw 40 penetrates through a counterbore 12H of the first body portion 12, and is screwed to a threaded hole 14H of the second body portion 14.

The compensator 20 is disposed in the chamber 11, and has a second top surface 20T directly contacting with the body 10 and a second bottom surface 20B disposed opposite the second top surface 20T. For example, the compensator 20 may be fixed into the body 10 by way of shaft-hole tight fitting or adhering. Compared with the body 10, the compensator 20 is a softer element. That is, the hardness of the compensator 20 is lower than the hardness of the body 10. For example, the overall compensator 20 may be made of an acrylonitrile butadiene styrene (ABS) plastic material. In this embodiment, the compensator 20 includes a first compensation structure 23 and a second compensation structure 24. The first compensation structure 23 may be made of the ABS plastic material, and has a large-diameter portion 23A and a small-diameter portion 23B connected together and disposed coaxially. That is, the first compensation structure 23 has a larger cylinder and a small cylinder connected together. The second compensation structure 24 surrounds the small-diameter portion 23B, and has an outer diameter substantially equal to an outer diameter of the large-diameter portion 23A. That is, the second compensation structure 24 fills the peripheral vacancy of the first compensation structure 23 to form a large cylinder together with the first compensation structure 23. It is to be noted that although the body 10 and the compensator 20 are provided in the form of cylinders, each of the body 10 and the compensator 20 may also be provided in other forms, such as a cuboid, a cube, a cone or the like.

A compensating passage 22 is formed between the body 10 and the second bottom surface 20B of the compensator 20 and has a height defined as a second gap G2. The material of the second compensation structure 24 is, for example, a steel material. The second compensation structure 24 is a harder than the first compensation structure 23 so that the upper surface of the compensating passage 22 becomes evener to facilitate the active compensation and provide the stable movement with the higher rigidity. Compared with the body 10, the first compensation structure 23 of the compensator 20 is the softer element. That is, the hardness of the first compensation structure 23 is lower than the hardness of the body 10.

The compensating passage 22 communicates with the input passage 13 and the output passage 15. A pressurized fluid CF provided from a fluid supply flows from the input passage 13 to the output passage 15 through the compensating passage 22, so that the pressurized fluid CF of the output passage 15 flows into the first gap G1 to maintain the stability and the rigidity/stiffness of the relative movement between the first structure 2 and the second structure 3. The conduit for the pressurized fluid CF may pass through or may be connected to a through hole 2C of the first structure 2. It is to be noted that the output passage 15 may also be referred to as a pocket.

In addition, in order to prevent the oil from leaking, the active compensating hydrostatic bearing 1 may further include a sealing ring 30 disposed between the first body portion 12 and the second body portion 14 to provide the sealing function for the first body portion 12 and the second body portion 14.

Figure 8:
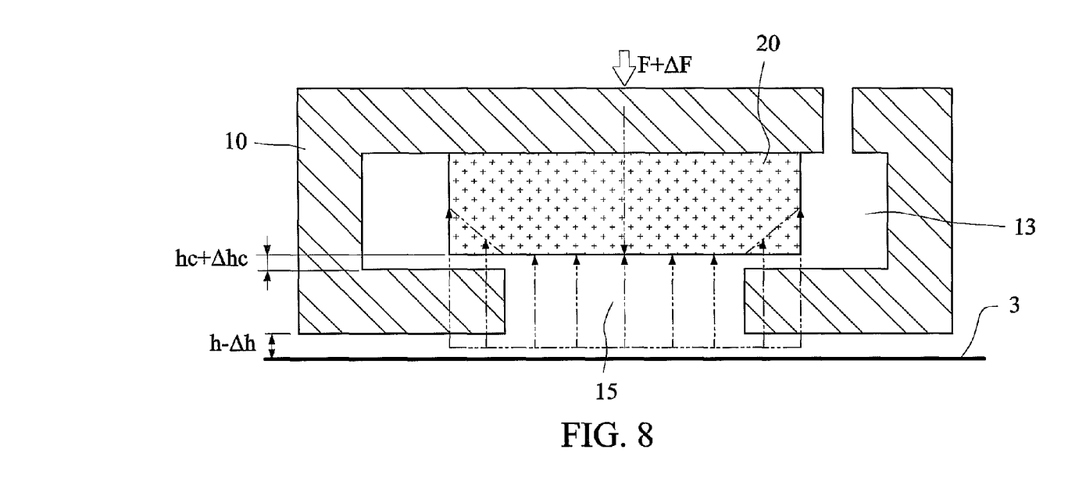
FIG. 8 is a simple schematic illustration showing the active compensating hydrostatic bearing according to the invention and is also a free-body diagram of the compensator in a forced state.
Figure 9:
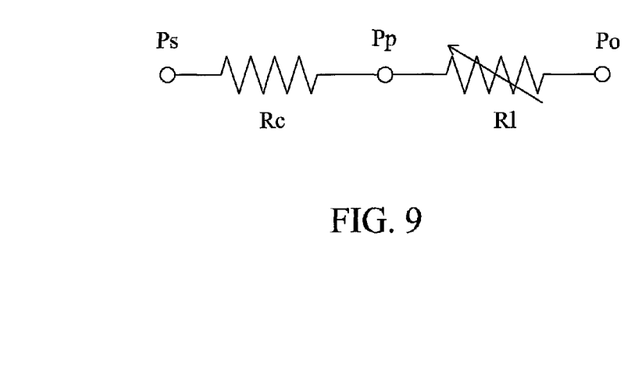
FIG. 9 is an equivalent circuit diagram showing the active compensating hydrostatic bearing according to the invention.

FIG. 8 is a simple schematic illustration showing the active compensating hydrostatic bearing according to the invention and is also a free-body diagram of the compensator in a forced state. FIG. 9 is an equivalent circuit diagram showing the active compensating hydrostatic bearing according to the invention, wherein Pp represents the pocket pressure, Ps represents the supply pressure, Po represents the external environment pressure, such as the pressure of 1 atmosphere, Rc represents the equivalent resistor to the oil film in the second gap G2, and Rl represents the equivalent resistor to the oil film in the first gap G1.

The compensator 20 is made of the softer material and is connected to the body 10 of the bearing. In the working state, the value of the second gap (also referred to as an oil film gap) G2 between the compensator 20 and the body 10 of the bearing is equal to "hc", and the flow resistance, which is caused by the oil film gap hc and referred to as the restrictor flow resistance, provides the restrictor compensation for the bearing.

When the pocket pressure Pp fluctuates with the variation of the external load F in the working state, the pocket pressure Pp applied to the compensator 20 is also changed, and "hc" is changed due to the deformation of the compensator 20, so that the change of the flow resistance of the oil film gap hc provides the compensation for the pocket pressure Pp. This type of compensation pertains to the active restrictor compensation. The operations are shown in FIG. 8. When an external force (F+ΔF) is applied to the bearing, the value of the first gap G1 (herein after referred to as the pocket gap) between the body 10 and the second structure 3 becomes (h−Δh). At this time, the pressure of the pocket 15 is increased to bear the external force, and the compensator 20 bears the pocket pressure higher than that at the original balanced position and thus deforms, wherein the oil film gap hc becomes (hc+Δhc). In general, when the external force is applied, the adjustment of each of the oil film gap hc and the pocket gap h changes the flow resistance, and the variation of the flow resistance increases the pocket pressure to achieve the effect of automatic compensation.

Figure 10:
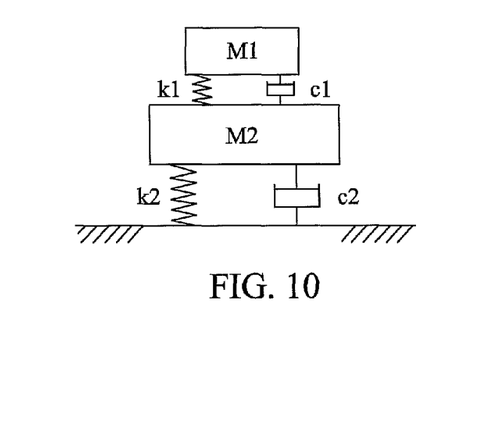
FIG. 10 shows a dynamic model of the active compensating hydrostatic bearing according to the invention.

FIG. 10 shows a dynamic model of the active compensating hydrostatic bearing according to the invention, wherein M1 and M2 represent two proof masses, k1 and k2 represent the springs, and c1 and c2 represent dampers. The vibration absorbing effect of the bearing with two dampers is better than that of the conventional bearing with the single damper.

Figure 11:
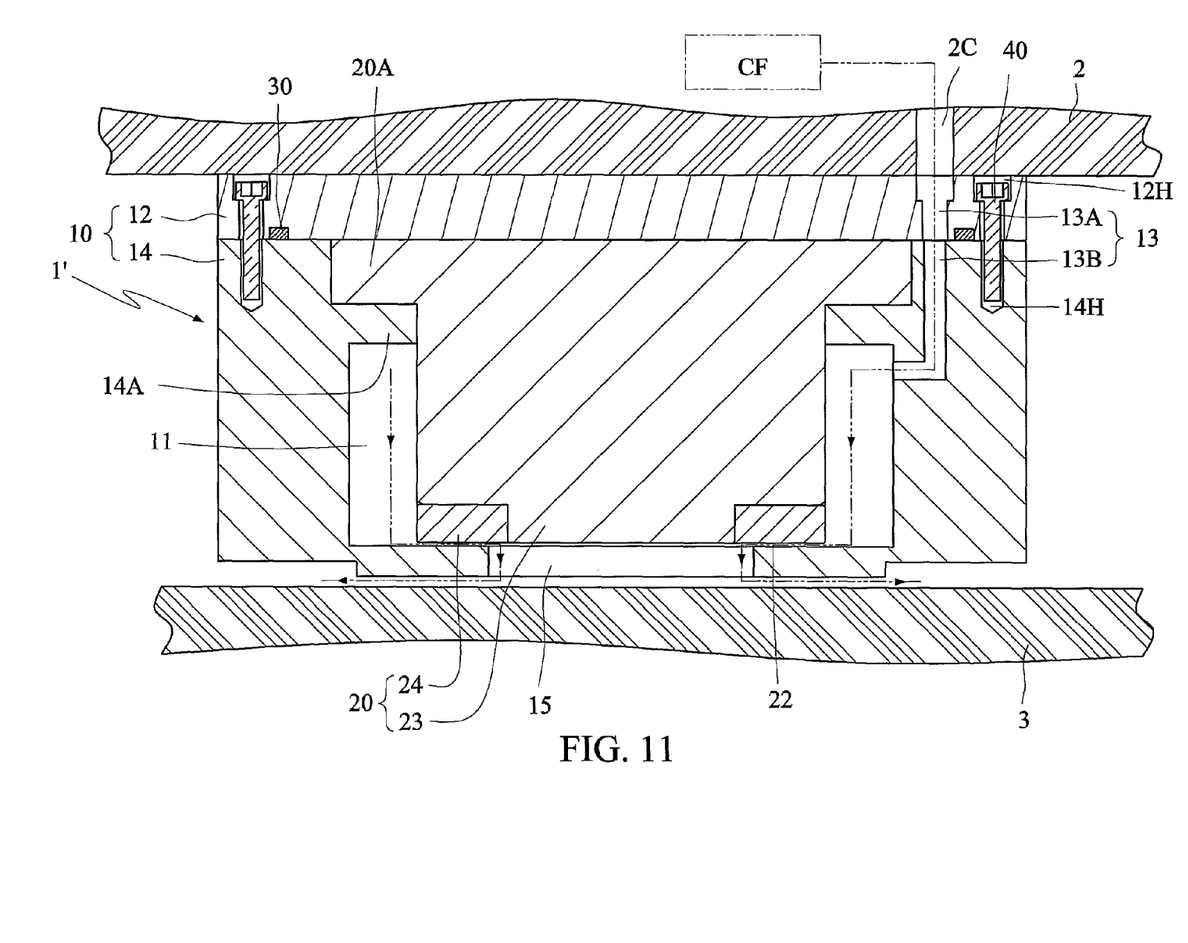
FIG. 11 is a cross-sectional view showing an active compensating hydrostatic bearing according to a second embodiment of the invention.

FIG. 11 is a cross-sectional view showing an active compensating hydrostatic bearing 1' according to a second embodiment of the invention. As shown in FIG. 11, the hydrostatic bearing 1' of this embodiment is similar to that of the first embodiment except that the first body portion 12 of the body 10 is fixed to the first structure 2 and has a first passage portion 13A of the input passage 13, and the second body portion 14 of the body 10 has the chamber 11 and a second passage portion 13B of the input passage 13. The first body portion 12 of the body 10 is fixed to the second body portion 14 of the body 10. In addition, the second body portion 14 of the body 10 has an inner flange 14A, and the compensator 20 has an outer flange 20A. The inner flange 14A and the outer flange 20A have the corresponding shapes, such as the circular, rectangular or any other shapes. The first body portion 12 urges the compensator 20 to make the outer flange 20A directly contact the inner flange 14A. Thus, during the assembly, the compensator 20 is installed into the chamber 11. At this time, the outer flange 20A rests against the inner flange 14A. Then, the first body portion 12 presses and covers the compensator 20, and the screws 40 are provided to screw the first body portion 12 to the second body portion 14 to make the outer flange 20A tightly press against the inner flange 14A. This bearing can provide the stable supporting effect.

It is to be noted that the rigidity of the bearing may be classified into the static rigidity and the dynamic rigidity. The static rigidity represents the variation of the pocket gap caused by the bearing, to which a force is applied in the steady state, wherein the static rigidity gets greater when the variation gets smaller. That is, the static rigidity represents the slope of the curve of the load-carrying capacity versus the pocket gap, and the initial static rigidity corresponds to the initial use state. On the other hand, the dynamic rigidity is defined under the dynamic loading. The invention can effectively enhance both the static rigidity and the dynamic rigidity, and has the excellent initial static rigidity. The high rigidity of the bearing represents that the working bearing can withstand the high loading without causing any significant displacement on the bearing or platen. Thus, the machining precision can be kept.

The active compensating hydrostatic bearing and the hydrostatic bearing module using the same according to the invention have the following advantages. First, the static initial rigidity of the bearing is enhanced. That is, the relative movement between the first structure and the second structure has the high rigidity (small displacement) because the restrictor flow resistance of the invention is modulated according to the pocket pressure. Second, the pocket and the restrictor device are integrated in this invention, and the conventional delay problem, caused by the hydrostatic bearing system connected to the lubrication oil conduit and the operation of the restrictor, can be solved. Third, the bearing of the invention only has two main assemblies, so the structure thereof is simple, and the elements thereof can be conveniently maintained and replaced. Fourth, the bearing of the invention has the small response amplitude under the dynamic loads and thus has the good dynamic rigidity. The load response amplitude of the bearing corresponding to different external force excitation frequencies represents the dynamic rigidity. This compensator can function as a vibration absorber for effectively absorbing the vibration between the first structure and the second structure. The smaller vibration represents the better dynamic rigidity of the bearing and thus satisfies the large-scale and precise machine tool.

While the present invention has been described by way of examples and in terms of preferred embodiments, it is to be understood that the present invention is not limited thereto. To the contrary, it is intended to cover various modifications. Therefore, the scope of the appended claims should be accorded the broadest interpretation so as to encompass all such modifications.

What is claimed is:

1. An active compensating hydrostatic bearing disposed between a first structure and a second structure to allow relative movement between the first structure and the second structure, the active compensating hydrostatic bearing comprising:
    a body, which has a first top surface and a first bottom surface disposed opposite the first top surface, wherein the first top surface is fixed to and in direct contact with the first structure, and the first bottom surface is separated from the second structure by a first gap, wherein the body further has a chamber and an input passage and an output passage both communicating with the chamber, and
    a compensator, which is disposed in the chamber, and has a top surface directly contacting with the body and a bottom surface disposed opposite the top surface, wherein a compensating passage is formed between the body and the bottom surface of the compensator, the compensating passage communicates with the input passage and the output passage, a pressurized fluid flows from the input passage to the output passage through the compensating passage, and the pressurized fluid in the output passage flows to the first gap to maintain stability and rigidity for the relative movement between the first and second structures.

2. The hydrostatic bearing according to claim 1, wherein the body comprises:
    a first body portion, which has a first chamber portion of the chamber and the input passage and is fixed to the first structure; and
    a second body portion having a second chamber portion of the chamber, wherein the first body portion of the body is fixed to the second body portion of the body.

3. The hydrostatic bearing according to claim 2, further comprising:
    a sealing ring disposed between the first body portion and the second body portion.

4. The hydrostatic bearing according to claim 2, wherein the first body portion and the second body portion are fixed together by a screw.

5. The hydrostatic bearing according to claim 1, wherein the compensator comprises:
    a first compensation structure having a large-diameter portion and a small-diameter portion, which are coaxial with and connected to each other; and
    a second compensation structure surrounding the small-diameter portion, wherein an outer diameter of the second compensation structure is substantially equal to an outer diameter of the large-diameter portion.

6. The hydrostatic bearing according to claim 5, wherein a hardness of the first compensation structure is lower than a hardness of the body.

7. The hydrostatic bearing according to claim 1, wherein a hardness of the compensator is lower than a hardness of the body.

8. The hydrostatic bearing according to claim 1, wherein the body comprises:
    a first body portion, which is fixed to the first structure and has a first passage portion of the input passage; and
    a second body portion having the chamber and a second passage portion of the input passage, wherein the first body portion of the body is fixed to the second body portion of the body.

9. The hydrostatic bearing according to claim 8, wherein the second body portion of the body has an inner flange, the compensator has an outer flange, and the first body portion presses the compensator to make the outer flange directly contact the inner flange.

10. A hydrostatic bearing module, comprising:
    a first structure;
    a second structure; and
    a plurality of active compensating hydrostatic bearings disposed between the first structure and the second structure to allow relative movement between the first structure and the second structure, each of the active compensating hydrostatic bearings comprising:
    a body, which has a first top surface and a first bottom surface disposed opposite the first top surface, wherein the first top surface is fixed to and in direct contact with the first structure, and the first bottom surface is separated from the second structure by a first gap, wherein the body further has a chamber and an input passage and an output passage both communicating with the chamber; and
    a compensator, which is disposed in the chamber, and has a top surface directly contacting with the body and a bottom surface disposed opposite the top surface, wherein a compensating passage is formed between the body and the bottom surface of the compensator, the compensating passage communicates with the input passage and the output passage, a pressurized fluid flows from the input passage to the output passage through the compensating passage, and the pressurized fluid in the output passage flows to the first gap to maintain stability and rigidity for the relative movement between the first and second structures.

11. The bearing module according to claim 10, wherein the body comprises:
    a first body portion, which has a first chamber portion of the chamber and the input passage and is fixed to the first structure; and
    a second body portion having a second chamber portion of the chamber, wherein the first body portion of the body is fixed to the second body portion of the body.

12. The bearing module according to claim 11, wherein the active compensating hydrostatic bearing further comprises:
    a sealing ring disposed between the first body portion and the second body portion.

13. The bearing module according to claim 11, wherein the first body portion and the second body portion are fixed together by a screw.

14. The bearing module according to claim 10, wherein the compensator comprises:
    a first compensation structure having a large-diameter portion and a small-diameter portion, which are coaxial with and connected to each other; and a second compensation structure surrounding the small-diameter portion, wherein an outer diameter of the second compensation structure is substantially equal to an outer diameter of the large-diameter portion.

15. The bearing module according to claim 10, wherein the body comprises:
   a first body portion, which is fixed to the first structure and has a first passage portion of the input passage; and
   a second body portion having the chamber and a second passage portion of the input passage, wherein the first body portion of the body is fixed to the second body portion of the body.

16. The bearing module according to claim 15, wherein the second body portion of the body has an inner flange, the compensator has an outer flange, and the first body portion presses the compensator to make the outer flange directly contact the inner flange.

17. The bearing module according to claim 10, wherein the first structure has a plurality of first receiving slots and a second receiving slot, the first receiving slots accommodate the active compensating hydrostatic bearings, respectively, and the second receiving slot accommodates the second structure.

* * * * *